United States Patent [19]
Swartz et al.

[11] Patent Number: 5,922,410
[45] Date of Patent: *Jul. 13, 1999

[54] WOOD COATING COMPOSITION

[75] Inventors: Andrew Joseph Swartz, Charlotte, N.C.; Maria Elizabeth Curry-Nkansah, Lansdale, Pa.; Rosemarie Palmer Lauer, Chalfont, Pa.; Matthew Stewart Gebhard, New Britain, Pa.

[73] Assignee: Rohm and Haas Company, Phila., Pa.

[*] Notice: This patent issued on a continued prosecution application filed under 37 CFR 1.53(d), and is subject to the twenty year patent term provisions of 35 U.S.C. 154(a)(2).

[21] Appl. No.: 08/374,459

[22] Filed: Jan. 18, 1995

[51] Int. Cl.$^6$ .............................. B05D 5/06; B05D 5/00; B32B 21/04
[52] U.S. Cl. .................. 427/393; 427/440; 428/537.1
[58] Field of Search .................. 428/537.1, 425.1; 106/34, 14.12, 14.13, 14.41; 524/460, 591; 523/221; 427/372.2, 408, 407.1, 393, 440

[56] References Cited

U.S. PATENT DOCUMENTS

| | | | |
|---|---|---|---|
| 3,617,368 | 11/1971 | Gibbs et al. | 117/161 UT |
| 3,711,449 | 1/1973 | Brendley, Jr. | 260/79.3 MU |
| 4,092,110 | 5/1978 | Adolphi et al. | 21/7 |
| 4,110,285 | 8/1978 | Pons et al. | 260/29.6 MU |
| 4,182,794 | 1/1980 | Smith et al. | 428/537 |
| 4,499,233 | 2/1985 | Tetenbaum et al. | 524/591 |
| 4,506,057 | 3/1985 | Greene et al. | 524/461 |
| 4,812,510 | 3/1989 | Barnett et al. | 524/807 |
| 4,891,401 | 1/1990 | Huybrechts et al. | 524/807 |
| 5,191,029 | 3/1993 | DelDonno | 525/366 |
| 5,286,778 | 2/1994 | Dean et al. | 524/460 |
| 5,334,655 | 8/1994 | Carlson et al. | 524/804 |
| 5,395,436 | 3/1995 | Setzke | 106/34 |
| 5,486,576 | 1/1996 | Larson et al. | 525/375 |
| 5,506,282 | 4/1996 | Min et al. | 523/221 |
| 5,552,228 | 9/1996 | Fong | 428/425.1 |

FOREIGN PATENT DOCUMENTS

| | | |
|---|---|---|
| 148970 | 7/1985 | European Pat. Off. . |
| 130789B1 | 9/1987 | European Pat. Off. . |
| 412385A1 | 2/1990 | European Pat. Off. . |
| 376591 A1 | 7/1990 | European Pat. Off. . |
| 541169 A1 | 5/1993 | European Pat. Off. . |
| 557694A1 | 9/1993 | European Pat. Off. . |
| 578068 A1 | 1/1994 | European Pat. Off. . |
| 1570615 | 7/1969 | Germany . |
| 58973 | 11/1996 | Luxembourg . |
| 2032805 | 5/1980 | United Kingdom . |

*Primary Examiner*—John J. Zimmerman
*Assistant Examiner*—Michael LaVilla
*Attorney, Agent, or Firm*—Hsiang-ning Sun

[57] ABSTRACT

The invention relates to wood coating composition selected to accentuate the color and the natural grain structure of the underlying surface of a wood article, such as, a furniture or carving. The surface of the article is coated with a waterborne system that includes a copolymer copolymerized from at least one first copolymerizable monomer and at least one second copolymerizable monomer containing a conjugate base of a strong acid. The coating enhances the reddish-yellow hues and suppress the bluish hues and grays. Such a coating is aesthetically pleasing and it enhances the natural beauty of high quality wood, such as, rose, cherry, teak, mahogany. The present method can be utilized by furniture manufacturers who plan to replace solvent borne coating compositions, such as nitrocellulose-based lacquers, with waterborne coating compositions.

9 Claims, No Drawings

WOOD COATING COMPOSITION

This invention generally relates to wood coating compositions selected to accentuate the color of the underlying wood substrate surface and to a method for producing wood articles coated with such coating compositions. More particularly it relates to selected waterborne coatings that produce coated wood articles having a desired degree of warmth.

Natural color and grain structure of wood, such as, teak, cherry, oak, walnut, mahogany and rose wood, is highly prized in applications, such as, furniture and wood carvings. Several types of wood coatings have been used to bring out the natural beauty of the wood color and grain. For example, solvent borne nitrocellulose coating compositions, such as lacquers, applied directly over a wood substrate not only enhance its color and grain structure but also protect the substrate from damage. Solvent borne nitrocellulose coating compositions, when applied over a wood substrate cause a change in the perceived color of the underlying wood substrate surface. These coating compositions tend to accentuate colors that include brighter red and yellow hues. This combination of features leads to a finished wood product that is perceived as having a high degree of warmth. However, these solvent-based coating compositions are undesirable due to environmental concerns and safety and health issues. Therefore, furniture manufacturers would like to reduce the organic solvent content through the use of substantially waterborne coatings.

However, current waterborne coating compositions tend to accentuate blue hues and impart a gray or darkened appearance when applied over a wood substrate. These aspects are perceived as a lack of warmth, and are undesirable. Because aesthetics and color matching are so important to clear wood coatings, especially in furniture applications, this lack of warmth presents a problem to the furniture coaters when trying to replace solvent borne nitrocellulose coating compositions with waterborne coatings. The method of the present invention solves this problem by selecting a wood coating composition having specific copolymers that enhance the red and yellow hues and minimize the blue hues and gray or darkened appearance.

The present invention is directed to a method of preparing a wood coating composition comprising selecting a waterborne system of a copolymer copolymerized from at least one first copolymerizable monomer and at least one second copolymerizable monomer containing a conjugate base of an acid, the acid having a pKa of less than 4.

The present invention is further directed to a method of improving the warmth of a coated wood article comprising applying over a wood substrate a waterborne system of a copolymer copolymerized from at least one first copolymerizable monomer and at least one second copolymerizable monomer containing a conjugate base of an acid, the acid having a pKa of less than 4.

The present invention is also directed to a coated wood article having improved warmth comprising, a wood substrate; and a coating applied over surface of the wood substrate, the coating comprising a dried waterborne system of a copolymer copolymerized from at least one first copolymerizable monomer and at least one second copolymerizable monomer containing a conjugate base of an acid, the acid having a pKa of less than 4.

As used herein:

"Acid" means a chemical compound capable of donating a proton, such as for example, acrylic acid.

"pKa" means the logarithm of the reciprocal of the dissociation constant in water of a conjugate base and a proton. The pKa of an acid quantifies the strength of an acid, such that acids with a pKa less than 4 signifies stronger acids and acids with a pKa higher than 4 signifies weaker acids.

"Conjugate base" means the species formed by the dissociation of a proton from an acid.

"Polymer solids" means copolymer in its dry state.

"Waterborne coating composition" means a composition that utilizes water as the primary dispersing medium.

"Solvent borne coating composition" means a composition that utilizes an organic solvent as the primary dispersing medium.

"Waterborne system" as used herein includes a water soluble copolymer solubilized in an aqueous solution, a water insoluble particles of a copolymer dispersed in an aqueous medium, or a combination thereof. The aqueous solution means water or a water miscible solvent, such as, isopropanol and ethylene glycol monobutyl ether, dissolved in water.

"Wood grain" refers to the arrangement of wood elements on the surface of a wood substrate, i.e., a surface pattern resulting from the growth rings of the wood.

A waterborne system of the present invention includes a copolymer prepared from at least one first copolymerizable monomer. These monomers can be employed at a concentration in the range of from 50 percent to 99.9 percent by weight, preferably in the range of from 60 percent to 99.5 percent by weight, all weight percentages based on the total weight of the polymer solids. The first polymerizable monomer may include one or more of the following monomers, such as, for example, acrylic and methacrylic ester monomers including methyl (meth)acrylate, ethyl (meth)acrylate, butyl (meth)acrylate, 2-ethylhexyl (meth)acrylate, decyl (meth)acrylate, lauryl (meth)acrylate, isobornyl (meth)acrylate, isodecyl (meth)acrylate, oleyl (meth)acrylate, palmityl (meth)acrylate, stearyl (meth)acrylate, hydroxyethyl (meth)acrylate, and hydroxypropyl (meth)acrylate; acid functional monomers with a pKa greater than 4, such as, acrylic acid, methacrylic acid, crotonic acid, itaconic acid, fumaric acid and maleic acid; monomethyl itaconate; monomethyl fumarate; monobutyl fumarate; maleic anhydride; acrylamide or substituted acrylamides; diacetone acrylamide; glycidal methacrylate; acetoacetyl ethylmethacrylate; acrolein and methacrolein; dicyclopentadienyl methacrylate; dimethyl meta-isopropenyl benzyl isocyanate; isocyanato ethylmethacrylate; styrene or substituted styrenes; butadiene; ethylene; vinyl monomers, such as, for example, vinyl chloride, vinylidene chloride, N-vinyl pyrrolidone; amino monomers, such as, for example, N,N'-dimethylamino (meth)acrylate and acrylonitrile or methacrylonitrile.

The copolymer of the present invention is prepared from at least one second copolymerizable monomer containing a conjugate base of an acid wherein the acid has a pKa of less than 4. The preferred range of pKa varies from 0.5 to 3.5. These monomers can be employed at a concentration in the range of from 0.1 weight percent to 50 weight percent, preferably in the range from 0.5 to 40 weight percent, all weight percentages based on the total weight of the polymer solids.

The conjugate base is a functionality selected from the group consisting of a sulfonate, phosphate, phosphonate, sulfate functionality and a combination thereof.

The conjugate base may be provided in the form of a salt of monomer acids, such as, 2-acrylamido-2-methylpropane sulfonic acid; phosphoethyl (meth)acrylate; phosphobutyl (meth)acrylate; phosphopropyl (meth)acrylate; phosphoethyl acrylate; vinyl sulphonic acid; styrene sulphonic acid;

sulfoethyl (meth)acrylate; methacryloxyisopropyl acid sulfopthalate; and hydroxy, dihydroxy, amino or diamino alkyl or aryl sulfonic acids, such as, 1,4-butane diol 2-sulfonic acid.

The copolymer used in this invention is a substantially thermoplastic or substantially uncrosslinked copolymer when applied to the substrate. If desired, premature crosslinking or gelling of the copolymer is induced by adding to the monomer mix multi-ethylenically unsaturated monomers in the range of 0.1% to 25%, by weight based on the weight of the copolymer. Typical multi-ethylenically unsaturated monomers include allyl methacrylate, diallyl phthalate, 1,4-butylene glycol dimethacrylate, 1,6-hexanedioldiacrylate and divinyl benzene. It is important, however, that the quality of the film formation is not materially impaired.

The glass transition temperature of the copolymer is in the range of −40° C. to 120° C., as measured by conventional differential scanning calorimetry (DSC). To measure the Tg by this method, the copolymer samples were dried, preheated to 120° C., rapidly cooled to −100° C., and then heated to 150° C. at a rate of 20° C./minute while data was being collected. The Tg was measured at the midpoint of the inflection using the half-height method. The copolymer having a Tg in the range of 0° C. to 90° C. is preferred.

The polymerization techniques used to prepare such a copolymer are well known in the art. The copolymer may be prepared by aqueous solution polymerization or emulsion polymerization. Emulsion polymerization is preferred. Either thermal or redox initiation processes may be used.

The polymerization process is typically initiated by conventional free radical initiators, such as, for example, hydrogen peroxide, benzoyl peroxide, t-butyl hydroperoxide, t-butyl peroctoate, ammonium and alkali persulfates, typically at a level of 0.05 percent to 3.0 percent by weight, all weight percentages based on the weight of total monomer. Redox systems using the same initiators coupled with a suitable reductant such as, for example, isoascorbic acid and sodium bisulfite may be used at similar levels.

Chain transfer agents, such as, for example, mercaptans may be used in an amount effective to provide a GPC weight average molecular weight of 500 to 5,000,000. "GPC weight average molecular weight" means the weight average molecular weight determined by gel permeation chromatography (GPC) described on page 4, Chapter I of The Characterization of Polymers published by Rohm and Haas Company, Philadelphia, Pa. in 1976, utilizing polymethyl methacrylate as the standard.

The diameter of the copolymer is controlled by the amount of conventional surfactants added during the emulsion polymerization process. Conventional surfactants include anionic, nonionic emulsifiers or their combination. Typical anionic emulsifiers include alkali or ammonium alkyl sulfates, alkyl sulfonic acids, alkyl phosphonic acids, fatty acids, and oxyethylated alkyl phenol sulfates and phosphates. Typical nonionic emulsifiers include alkylphenol ethoxylates, polyoxyethylenated alkyl alcohols, amine polyglycol condensates, modified polyethoxy adducts, polyoxyethylenated mercaptans, long chain carboxylic acid esters, modified terminated alkylaryl ether, and alkylpolyether alcohols. Preferred particle size of the copolymer is in the range from 20 to 1000 nanometers, and more preferably in the range from 30 to 300 nanometers. The aqueous dispersion can contain more than one copolymer particle size.

Alternatively, the copolymer may include multi-stage polymer particles having two or more phases of various geometric structures, such as, for example, core/shell or core/sheath particles, core/shell particles with shell phases incompletely encapsulating the core, core/shell particles with a multiplicity of cores and interpenetrating network particles. In all of these cases the majority of the surface area of the particle will be occupied by at least one outer phase and the interior of the latex polymer particle will be occupied by at least one inner phase. The outer phase of the multi-stage polymer particles weighs 5 weight percent to 95 weight percent based on the total weight of the particle. A GPC weight average molecular weight of these multi-stage polymer particles is preferably in the range of 500 to 5,000,000.

The multi-stage polymer particles are prepared by conventional emulsion polymerization process in which at least two stages differing in composition are formed in a sequential fashion. Such a process usually results in the formation of at least two polymer compositions. Each of the stages of the multi-stage polymer particles may contain the same monomers, chain transfer agents, surfactants, as those disclosed earlier for the polymer particles. The emulsion polymerization techniques used for preparing such multi-stage polymer particles are well known in the art and are disclosed, for example, in the U.S. Pat. Nos. 4,325,856, 4,654,397 and 4,814,373.

The copolymer of the present invention also includes two first copolymerizable monomers that can be condensation polymerized. Such polymers, for example, include a polyol monomer with a diisocyanate monomer. The polyol monomers suitable for use in the present invention include polyether diols, polyester diols, ethyleneglycol and propyleneglycol. The diisocyanate monomers suitable for use in the present invention include toluene diisocyanate, isophorone diisocyanate, hexamethylene diisocyanate, bis(4-isocyanatocyclohexyl)methane, bis(4-isocyanatocyclohexyl)methane. These examples illustrate difunctional monomers; however, trifunctional or multifunctional analogues of these monomers may be used for introducing branching or crosslinking in the copolymer.

The copolymer polymerized from the polyol and diisocyanate monomers preferably includes polyurethane particles dispersed in an aqueous continuous phase (PUD). The polymer particles of polyurethane are made by the well known reaction between polyols and polyisocyanates to give isocyanate terminated prepolymers. These prepolymers are then dispersed in the aqueous phase. Diamine and triamines are often added to the waterborne system of the prepolymer to react with the remaining isocyanate groups for increasing the molecular weight of the polymer particles and for incorporating more urea groups in the polymer chain. After dispersion, the remaining isocyanate groups in the prepolymer can also react with water to yield an amine. These amines will react with isocyanate groups to chain extend the prepolymer. The polyols used to prepared PUDs can be either linear or branched polyethers, polyesters, or polycarbonate polyols. Low molecular weight, below 500, diols and triols are often used in conjunction with the high molecular weight, above 500, polyols to adjust the amount of urethane content and branching in the PUD. The low molecular weight polyols can be selected to contain the requisite conjugate base of this invention, for example, a hydroxy, dihydroxy, amino or diamino alkyl or aryl sulfonic acids such as 1,4-butane diol 2-sulfonic acid. The polyisocyanate can be polymerized from any aliphatic, cycloalophatic or aromatic multifunctional isocyanate. The chain extenders can be any multifunctional amine, hydrazine, multifunctional hydrazine or hydrazide.

The waterborne system preferably contains from 20 weight percent to 70 weight percent, preferably from 30 weight percent to 65 weight percent, of the copolymer, all weight percentages based on the total weight of the waterborne system.

Depending on the intended use of the composition, additional components may be added to the composition described earlier. These additional components include but are not limited to, dyes, pigments, sanding aids, defoamers, waxes, silicone-based slip additives, wetting agents, preservatives, plasticizers, coalescents and freeze/thaw protectors. The level of coalescent used should be as low as required for adequate film formation. The coating composition, as applied to a wood substrate, contains from 2 weight percent to 50 weight percent, preferably from 5 weight percent to 40 weight percent of the copolymer, all weight percentages based on the total weight of the composition. It is preferred that the waterborne coating composition be substantially non-pigmented such that the coating is transparent.

The wood coating composition of the present invention may be further blended with other polymers. For example, the copolymer may be blended with a polyurethane, a polyester, an acrylic copolymer, a styrene/acrylic copolymer, or other polymers.

The wood coating composition of the present invention may further, contain a crosslinking agent, such as, a polyaziridine, polyisocyante, polycarbodiimide, polyepoxide, polyaminoplast, polyalkoxy silane, polyoxazolidine, polyamine and a polyvalent metal compound. The coating composition contains from 0.05 weight percent to 30 weight percent of the crosslinking agent, based on the weight of the polymer solids.

TEST PROCEDURES

The following test procedures were used for generating the data reported in the Examples below:

Measurement of "Warmth"

The most important aspect of color is the aesthetic and psychological responses to color and the way in which color influences an observer's perception of wood articles, such as, furniture and carvings. One example of the link between the color and the perception it invokes in the mind of an observer is that red and yellow hues are perceived as "warm", while blue hues and grays are perceived as "cold".

Color is an aspect of an object described in terms of its hue, saturation and brightness and these characteristics are used to distinguish one color from another. Hue is an attribute associated with each of the dominant wave lengths, such as, red, yellow and blue, of a spectrum. Saturation pertains to relative purity, or the amount of white light mixed with a hue. High-saturation colors contain little or no white light. Hue and saturation, taken together, are called chromaticity. Brightness refers to intensity distinguished by the degree of shading.

Accordingly, a color may be characterized by its chromaticity and brightness. The most widely used system of specifying and classifying color was adopted in 1931 by the Commission International de l'Eclairage (CIE), commonly called the International Commission on Illumination. The CIE system revised in 1976, employs a three dimensional "L", "a" and "b" chart in which "a" and "b" are planar chromaticity coordinates at right angles to one another and "L" is a brightness coordinate at right angle to the plane containing the chromaticity coordinates. In this chart "+a" value corresponds to red hue, "−a" value at a diametrically opposite end corresponds to green hue, "+b" value corresponds to yellow hue and "−b" value at a diametrically opposite end corresponds to blue hue. The brightness of color is measured along the "L" axis whereby a higher "L" value corresponds to light of increased intensity and a lower "L" value corresponds to light of decreased intensity. A low or negative "L" corresponds with a grayer, including black, color, while a high or positive "L" corresponds to a brighter, including white, color. Thus, by using this chart any color can be three dimensionally characterized by its chromaticity and brightness. For example, higher "b" values represent more yellowish hues and lesser bluish hues and lower "b" values represent more bluish hues and lesser yellowish hues.

The measurement of warmth is visually evaluated on the basis of a pass-fail test. A coated wood substrate that exhibits more reddish-yellow hues than a comparative control panel (defined below in Example 6) is considered to have passed the test and a coated wood substrate that exhibits same or more bluish hues and grays than those in the coating of the comparative control panel is considered to have failed the test. The comparative control panel was coated with a composition containing a copolymer having a copolymerizable monomer containing a conjugate base of a weak acid having a pKa higher than 4. A wood substrate coated with such a composition tends to accentuate blue hues and grays, which makes it appear less pleasing.

The visual pass-fail test is confirmed by comparing the "L" and "b" values of the coating on wooden test panels coated with the present composition against the "L" and "b" values of the coating on the comparative control panel, described above.

The "L" and "b" values for the separated coated regions on a test wood panel were determined using a Colorgard System 200 Model 05 Colorimeter supplied by Byk-Gardner Inc., Silver Spring, Md. A color scale based on the standard CIE system scale was used. The instrument was calibrated using the standard white and black color tiles. The "L" and "b" values were measured 50 times and averaged.

EXAMPLES

Example 1

A 4-liter, 4-neck round-bottom reaction kettle containing an initial kettle charge of 953.8 grams (g) of deionized (DI) water and 72.0 g 28% ammonium lauryl sulfate (ALS) was heated to 83° C. under a nitrogen sweep. At 83° C., a 48.4 g aliquot of a monomer emulsion (ME) comprising of 286 g DI of water, 9.6 g of 28% ALS, 309.0 g of 2-ethylhexyl acrylate (EHA), 544.0 g of methyl methacrylate (MMA), 9.0 g of acrylic acid (AA), 67.5 g of 50% 2-acrylamido-2-methylpropane sulfonate (AMPS) and 4.48 g of n-dodecyl mercaptan (nDDM) rinsed with 8.9 g of DI water, was added to the kettle followed by the addition of 2.2 g of ammonium persulfate (APS) dissolved in 8.9 g of DI water. A DI water rinse of 20.2 g was included in ME. After an 8–10 minute hold, ME at the rate of 63.7 g/10 minutes and an initiator solution of 0.45 g of APS dissolved in 71.4 g of DI water were gradually added to the kettle in 3 hours. The temperature of the batch in the kettle was maintained at 83±2° C. during the addition.

When all additions were completed, the batch was held for an additional 30 minutes at 83±2° C. The batch was then charged with 41.7 g of DI water and cooled to 60° C. With the kettle at 55–60° C., 2.99 g of 0.15% FeSO4•7H2O, 0.6 g of 70% t-butylhydroperoxide dissolved in 7.7 g DI water, and 0.3 g of sodium sulfoxylate formaldehyde dissolved in 8.9 g of DI water were added in the order stated herein. The batch was held for an additional 30 minutes at 55–60° C. before cooling to 45° C. A solution of 19 g of 29% $NH_3$ in 11 g of DI water was added over 5 minutes. At 37° C., the batch was diluted with 40 g of DI water and a biocide package was added.

The copolymer of Example 1 had a composition of 34.5 EHA/60.7 MMA/1 AA/3.8 AMPS all by weight percent based on the total weight of the polymer solids. The waterborne system of Example 1 had 36.3 percent by weight of the copolymer based on the total weight of the composition. Example 1 was adjusted to a pH of 7. The pKa of the acid (AMPS) of Example 1 is 1.9.

Example 2

The copolymer of Example 2 had a composition of 34.5 EHA/62.3 MMA/2 AA/1.2 phosphoethyl methacrylate (PEM) all by weight percent based on the total weight of the polymer solids. The waterborne system of Example 2 had 37.0 percent by weight of the copolymer based on the total weight of the composition. Example 2 was adjusted to a pH of 6.7. The pKa of the acid (PEM) of Example 2 is 2.2.

Example 3

The copolymer of Example 3 had a composition of 34.5 EHA/57.5 MMA/8 MAA all by weight percent based on the total weight of the polymer solids. The waterborne system of Example 3 had 36.9 percent by weight of the copolymer based on the total weight of the composition. Example 3 was adjusted to a pH of 6.6. The pKa of methacrylic acid of Example 3 is 4.7.

Example 4

Example 4 was prepared by blending 150 grams of the dispersion of Example 1, 1.6 grams of aqueous $NH_4OH$ (7%), 4.4 grams of diethylene glycol monobutyl ether, and 12.3 grams of ethylene glycol monobutyl ether.

Example 5

Example 5 was prepared by blending 150 grams of the dispersion of Example 2, 0.8 grams of aqueous $NH_4OH$ (7%), 4.4 grams of diethylene glycol monobutyl ether, and 12.3 grams of ethylene glycol monobutyl ether.

Example 6

Example 6 was prepared by blending 150 grams of the dispersion of Example 3, 0.8 grams of aqueous $NH_4OH$ (7%), 4.4 grams of diethylene glycol monobutyl ether, and 12.3 grams of ethylene glycol monobutyl ether.

Example 7

Example 7 was an organic solvent-based Akzo-Nobel Coating # 401-70LS-2045 nitrocellulose lacquer supplied by Akzo Nobel Coating Inc., High Point N.C., which was used by way of a contrast.

Different regions of a 30 cm×45 cm cherry veneer panel were coated to a film thickness 250 μm with clear films of each of the coating compositions described in Examples 4 to 7. Each clear film was 5 cm wide and 30 cm long. The individual films were coated in separate regions of the same panel. After drying for 24 hours, the coated regions were qualitatively (through the pass-fail test) and quantitatively (by measuring the "L" and "b" values described in the test procedures) rated for the warmth of the resultant coating. The results are shown in Table 1 below:

TABLE 1

| Example | "L" value | "b" value | Visual Test Result |
|---|---|---|---|
| Example 4 | 55.3 | 29.4 | Pass |
| Example 5 | 56.6 | 28.8 | Pass |
| Example 6 (comparative) | 53.0 | 28.5 | Fail |
| Example 7 (contrast) | 58.8 | 31.0 | Pass |

Thus, it is seen from Table 1 that examples 4 and 5 which utilize the second copolymerizable monomers containing conjugate bases of sulfonate (pKa of 1.9), and phosphate (pKa of 2.2) respectively, have improved warmth relative to the methacrylic acid-based comparative Example 6, having a pKa of 4.7. Furthermore, Examples 4 and 5 compare favorably against the solvent-based contrast Example 7.

What is claimed is:

1. A method of coating an article having a wood surface to accentuate yellow hues, to reduce blue hues and to brighten the wood surface relative to using a first water borne coating composition which consists of 0.8 grams of 7% aqueous $NH_4OH$, 4.4 grams of diethylene glycol monobutyl ether 12.3 grams of ethylene glycol monobutyl ether and 150 grams of a dispersion which consists of water and 36.9 weight percent, based on the total weight of the dispersion, of a first copolymer consisting of 34.5 weight percent of 2-ethylhexyl acrylate, 57.5 weight percent of methyl methacrylate and 8 weight percent of methacrylic acid, said method comprising:

applying over the wood surface a second waterborne coating composition which comprises
water; and
a second copolymer which is copolymerized from at least one first copolymerizable monomer; and
at least one second copolymerizable monomer being a conjugate base of an acid, wherein the acid has a pKa of less than 4, and the conjugate base is a functionality selected from the group consisting of sulfonate, phosphate, sulfate functionalities and combinations thereof; and drying said second waterborne coating composition on the wood surface.

2. The method of claim 1, wherein the conjugate base is a salt of a monomer acid selected from the group consisting of 2-acrylamido-2-methylpropane sulfonic acid; phosphoethyl (meth)acrylate; phosphobutyl (meth)acrylate; phosphopropyl (meth)acrylate; vinyl sulfonic acid; styrene sulfonic acid; sulfoethyl (meth)acrylate; methacryloxyisopropyl acid sulfophthalate; hydroxy alkyl sulfonic acid; hydroxy aryl sulfonic acid; dihydroxy alkyl sulfonic acid; dihydroxy aryl sulfonic acid; amino alkyl sulfonic acid; amino aryl sulfonic acid; diamino alkyl sulfonic acid and diamino aryl sulfonic acid.

3. A method of accentuating yellow hues, reducing blue hues and brightening a wood surface relative to a first coating film formed by using a first water borne coating composition which consists of 0.8 grams of 7% aqueous $NH_4OH$, 4.4 grams of diethylene glycol monobutyl ether, 12.3 grams of ethylene glycol monobutyl ether and 150 grams of a dispersion which consists of water and 36.9 weight percent, based on the total weight of the dispersion, of a first copolymer consisting of 34.5 weight percent of 2-ethylhexyl acrylate, 57.5 weight percent of methyl methacrylate and 8 weight percent of methacrylic acid, said method comprising:

applying over the wood surface a second waterborne coating composition which comprises
water; and
a second copolymer which is copolymerized from at least one first copolymerizable monomer; and
at least one second copolymerizable monomer being a conjugate base of an acid, wherein the acid has a pKa of less than 4, and the conjugate base is a functionality selected from the group consisting of sulfonate, phosphate, sulfate functionalities and combinations thereof; and drying said second waterborne coating composition on the wood surface to form a second coating film.

4. The method of claim 3 wherein said conjugate base is a salt of a monomer acid,
wherein said monomer acid is a monomer selected from the group consisting of 2-acrylamido-2-methylpropane sulfonic acid; phosphoethyl(meth)acrylate; phosphobutyl (meth)acrylate; phosphopropyl (meth)acrylate; phosphoethyl acrylate; vinyl sulphonic acid; styrene sulphonic acid; sulfoethyl (meth)acrylate; methacryloxyisopropyl acid sulfophthalate; hydroxy alkyl sulfonic acid; hydroxy aryl sulfonic acid; dihydroxy alkyl sulfonic acid; dihydroxy aryl sulfonic acid; amino alkyl sulfonic acid; amino aryl sulfonic acid; diamino alkyl sulfonic acid; and diamino aryl sulfonic acid.

5. The method of claim 3 wherein said first copolymerizable monomer is a monomer selected from the group consisting of:
acrylic and methacrylic esters, acid functional monomers with a pKa greater than 4, monomethyl itaconate, monomethyl fumarate, monobutyl fumarate, maleic anhydride, acrylamide, substituted acrylamides, diacetone acrylamide, glycidal methacrylate, acetoacetyl ethylmethacrylate, acrolein, methacrolein, dicyclopentadienyl methacrylate, dimethyl meta-isopropenyl benzyl isocyanate, isocyanato ethylmethacrylate, styrene, substituted styrenes, butadiene, ethylene, vinyl monomer and amino monomers.

6. The method of claim 3 wherein said first copolymerizable monomer is a monomer selected from the group consisting of:
methyl (meth)acrylate, ethyl (meth)acrylate, butyl (meth)acrylate, 2-ethylhexyl (meth)acrylate, decyl (meth)acrylate, lauryl (meth)acrylate, isobornyl (meth)acrylate, isodecyl (meth)acrylate, oleyl (meth)acrylate, palmityl (meth)acrylate, stearyl (meth)acrylate, hydroxyethyl (meth)acrylate, and hydroxypropyl (meth)acrylate.

7. The method of claim 3 wherein said first copolymerizable monomer is a monomer selected from the group consisting of:
acrylic acid, methacrylic acid, crotonic acid, itaconic acid, fumaric acid and maleic acid.

8. The method of claim 3 wherein said first copolymerizable monomer is a monomer selected from the group consisting of:
vinyl chloride, vinylidene chloride and N-vinyl pyrrolidone.

9. The method of claim 3 wherein said first copolymerizable monomer is a monomer selected from the group consisting of:
N,N'-dimethylamino (meth)acrylate; acrylonitrile; and methacrylonitrile.

* * * * *